United States Patent
Winbow et al.

(10) Patent No.: US 8,731,838 B2
(45) Date of Patent: May 20, 2014

(54) FRESNEL ZONE FAT RAY TOMOGRAPHY

(75) Inventors: Graham A. Winbow, Houston, TX (US); Hongchuan Sun, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 359 days.

(21) Appl. No.: 13/113,843

(22) Filed: May 23, 2011

(65) Prior Publication Data

US 2012/0010820 A1    Jan. 12, 2012

Related U.S. Application Data

(60) Provisional application No. 61/362,519, filed on Jul. 8, 2010.

(51) Int. Cl.
*G01V 1/00* (2006.01)

(52) U.S. Cl.
USPC ............................................. 702/18; 702/2

(58) Field of Classification Search
USPC ........ 703/2; 702/2, 18; 382/109, 131; 367/64
See application file for complete search history.

(56) References Cited

U.S. PATENT DOCUMENTS

| | | | |
|---|---|---|---|
| 5,062,086 A | 10/1991 | Harlan et al. | |
| 6,691,075 B1 * | 2/2004 | Winbow et al. | 703/2 |
| 6,778,907 B1 | 8/2004 | Washbourne et al. | |

OTHER PUBLICATIONS

Zhang et al. 'First Arrival Seismic Tomography Based on Fat Ray', 2007, pp. 1-5, London 2007 Publication.*

Bevc, D. et al. (2008), "Wavepath tomography for model building and harzard detection," *SEG Expanded Abstracts* 27, pp. 3098-3102.
Červený, V. et al. (1992), "Fresnel volume ray tracing," *Geophysics* 57, pp. 902-915.
Červený, V. et al. (1985), "In Seismic Shear Waves Part A: Theory," ed. G.P. Dohr Publ. Geophysical Press, pp. 124-126.
Dahlen, F.A. et al. (2000), Fréchet kernels for finite-frequency traveltimes—I. Theory, *Geophys. I Int.* 141, pp. 157-174.
de Hoop M.V. et al. (2006), "Wave equation reflection tomography: annihilators and sensitivity kernels," *Geophys. J. Int.* 167, pp. 1332-1352.
Gilbert, F. et al. (1966), "Propagator Matrices in Elastic Wave and Vibration Problems," *Geophysics* 31, pp. 326-332.
Hung, S.H. et al. (2000), "Fréchet kernels for finite-frequencey traveltimes—II. Examples," *Geophys. J. Int.* 141, pp. 175-203.
Kvansicka, M. et al. (1996), "Analytical Expression for Fresnel Volumes and Interface Fresnel Zones of Seismic Body Waves, Part I: Direct and Uncoverted Reflected Waves," *Studia Geoph. et Geod.* 40, pp. 136-155.
Paige, C. et al. (1982), "LSQR: An Algorithm for Sparse Linear Equations and Sparse Least Squares," *ACM Transactions on Mathemtical Software* 8, pp. 43-71.
Xie, X-B. et al. (2008), "The finite-frequency sensitivity kernel for migration residual moveout and its applications in migration velocity analysis," *Geophysics* 73(6), pp. S241-S249.

(Continued)

*Primary Examiner* — Elias Desta
(74) *Attorney, Agent, or Firm* — ExxonMobil Upstream Research Company Law Dept.

(57) ABSTRACT

A stable method for using fat-ray tomography to determine a high-resolution velocity model of the subsurface from seismic data (71). The velocity model (72) may be used in migrating the seismic data (76) to image the subsurface. Rays are traced from a subsurface reflection point to surface source and receiver locations (73), using Fresnel zone construction methods (74) that honor correct initial conditions, with the Fresnel radius being a function of velocity.

15 Claims, 7 Drawing Sheets

(56) References Cited

OTHER PUBLICATIONS

Xu, S. et al. (2006), "Enhanced tomography resolution by a fat ray technique," *SEG Expanded Abstracts* 25, pp. 3354-3358.

Sheriff, R.E. (2002), *Encyclopedic Dictionary of Applied Geophysics*, Society of the Exploration Geophysicists, p. 361.

* cited by examiner

FRESNEL ZONE FAT RAY TOMOGRAPHY

CROSS-REFERENCE TO RELATED APPLICATION

This application claims the benefit of U.S. Provisional Patent Application 61/362,519, filed Jul. 8, 2010, entitled FRESNEL ZONE FAT RAY TOMOGRAPHY, the entirety of which is incorporated by reference herein.

FIELD OF THE INVENTION

The invention relates generally to the field of geophysical prospecting, and more particularly to seismic data processing. Specifically, the invention pertains to solving the problem of how to determine velocities in the subsurface for use in seismic migration.

BACKGROUND OF THE INVENTION

Migration of seismic data (moving reflectors in a subsurface image to their true depths by data processing) requires making some estimate of the acoustic velocity which normally varies throughout the subsurface region of interest. In this context, "velocity" normally means the velocity and also any anisotropy parameters included in the velocity model. It is well known that migration results depend on the assumed velocity in the subsurface and therefore in order to obtain the best possible image from seismic data the velocity has first to be estimated in an optimal manner. The existing technology typically uses ray tomography. In this case seismic reflectors are typically imaged at a range of offsets. (The offset is the source-receiver spacing). Each offset should in principle provide a similar image except for different seismic amplitudes. It is often noted, however, that the images at different offsets differ in the depth of each imaged reflector. This implies that the velocity is incorrect. The data are usually displayed as a gather at each of many image points, so that the seismic images are sequenced firstly at varying offsets and secondly over image location in horizontal image variable. In a typical tomography program the velocity is then adjusted in such a way as to flatten the gathers (i.e. to minimize the discrepancies in reflector depths among the members of the gather). The gathers may be offset gathers, angle gathers, shot gathers or receiver gathers. If the data are being processed with ray based techniques, it is common to use offset gathers.

In typical ray based tomography programs, the velocity inversion is usually unstable. Therefore it is common to add additional terms into the program in such a way as to stabilize the calculations. One effect of such terms is to reduce the spatial resolution. In addition, such terms are usually not related to the physics of the problem, and therefore create uncertainty about the reliability of the final velocity model.

Because the final seismic image depends to a considerable degree on the velocity model, it is important to obtain as accurate a velocity model as possible and the best possible spatial resolution. As noted in the references below, it has been found in refraction seismic work in whole earth geophysics that modeling the seismic arrivals using so-called fat rays produces more highly resolved images. However up to the present time there has not been any fat ray technique especially designed to apply to reflection images and at the same time containing the appropriate physics of the reflection imaging problem.

Dahlen et al. (2000a) show how to use fat rays in whole earth tomography using transmitted arrivals through the earth. While their paper contains a detailed mathematical analysis of the transmission imaging problem, they do not discuss the reflection imaging problem.

Dahlen et al. (2000b) provide a detailed discussion of P-wave ray tomography in a spherical earth model. For most imaging problems in reflection imaging, the velocity model is much more complex, and therefore new techniques are needed.

Cerveny and Soares (1992) describe how to construct fat rays for arbitrary velocity. Their methods are primarily analytical, and do not address the computational issues faced in typical reflection imaging situations. In particular, they assume that the fat rays are calculated by propagating energy from source to receiver. In actual practice, as disclosed in this application, it is more convenient and computationally more efficient to calculate the fat rays from each image point.

Xie and Yang (2008) and de Hoop et al (2006) discuss wave equation based velocity analysis. This approach has considerable potential advantages; however it typically requires very intensive computation especially for 3D processing which is the major application of velocity analysis methods.

Xu et al (2006) present a fat ray tomography technique. However their fat rays do not cover the physically correct zone in space, and therefore can be viewed as a way of improving the stability of the calculation without actually affecting the resolving power of the method.

Bevc et al (2008) present a wave equation based fat ray tomography method. Their fat rays also do not cover the region actually required even for the simplest earth models.

There is therefore a need for a technique that is mathematically stable, has optimal resolution and at the same time is acceptable in terms of the computational effort required. The present invention satisfies these criteria.

SUMMARY OF THE INVENTION

In one of its embodiments, the invention is a method for imaging subsurface structure from seismic data, comprising migrating the seismic data on a computer using a velocity model of the subsurface, said velocity model being generated by computer-implemented fat-ray tomography, each fat ray shot from a reflection point to a surface source or receiver location and defined by a Fresnel matrix and dip at each ray-tracing grid point, said Fresnel matrix depending upon the velocity model at each grid point, including at the reflection point.

Figure 7:
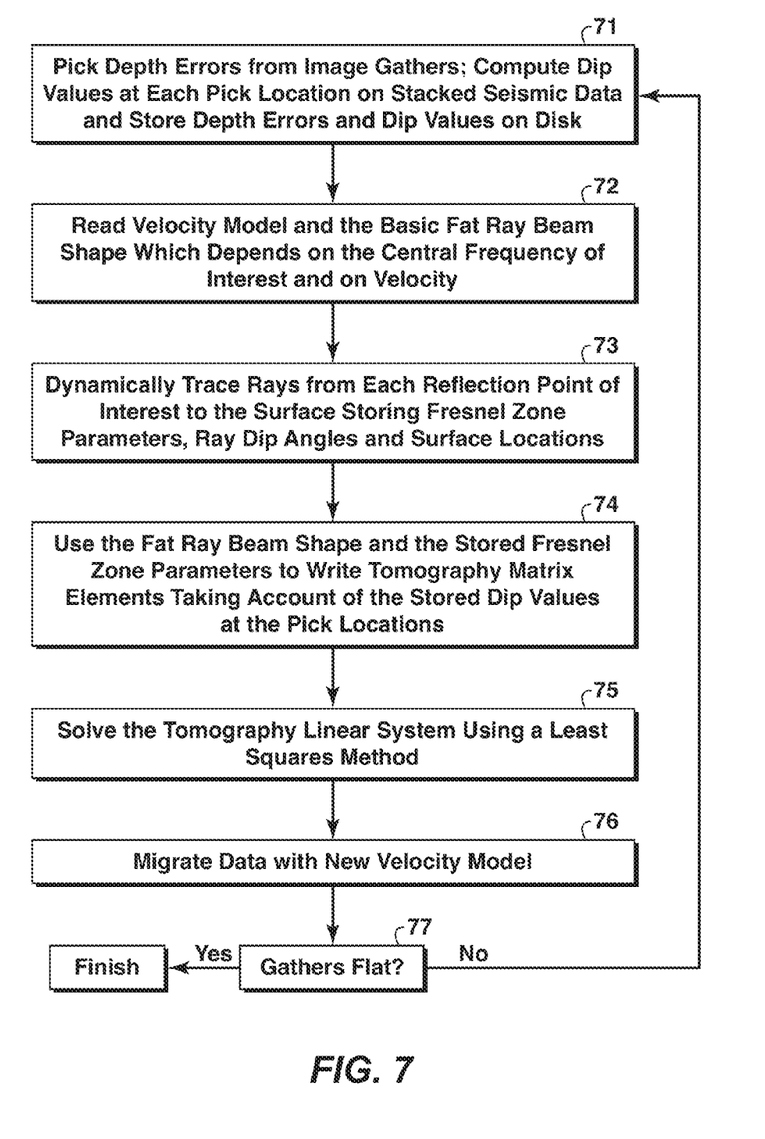
FIG. 7 illustrates a flow diagram for the present tomographic method using fat rays.

In a more detailed embodiment of the invention, the method includes, with reference to the flowchart of FIG. 7, (Step 71) picking depth errors from image data gathers of different source-receiver offsets, and computing ray dip values at each pick location on stacked seismic data, and storing depth errors and dip values in computer memory or data storage;

(Step 72) determining a fat ray beam shape for a central frequency using an initial velocity model, said central frequency being determined from an assumed seismic wave pulse shape;

(Step 73) dynamically tracing rays from selected reflection points to the surface source and receiver locations, and storing Fresnel zone parameters, ray dip angles and surface locations in computer memory or data storage;

(Step 74) using the fat ray beam shape and the stored Fresnel zone parameters to write elements of a tomography matrix M taking into account the stored dip values at the pick locations;

(Step 75) solving the tomography linear system $M \cdot \delta\sigma = \delta z$ using a least squares method, where $\delta\sigma$ is the slowness, i.e. reciprocal of the velocity, and $\delta z$ represents the depth errors observed in the image data gathers, and making a new velocity model from the solutions for δσ, and (Step 76) migrating the seismic data with the new velocity model.

If the gathers are still not flat with the new velocity model, the method may return to step 71 and repeat the cycle, iterating until a convergence criterion or other stopping condition is met.

BRIEF DESCRIPTION OF THE DRAWINGS

The patent, or application file, contains at least one drawing executed in color, except in jurisdictions that do not allow color. In those jurisdictions, it will be understood that FIGS. 5 and 12 are black and white reproductions of colored data displays. Copies of this patent or patent application with color drawings will be provided by the U.S. Patent and Trademark Office upon request and payment of the necessary fee.

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
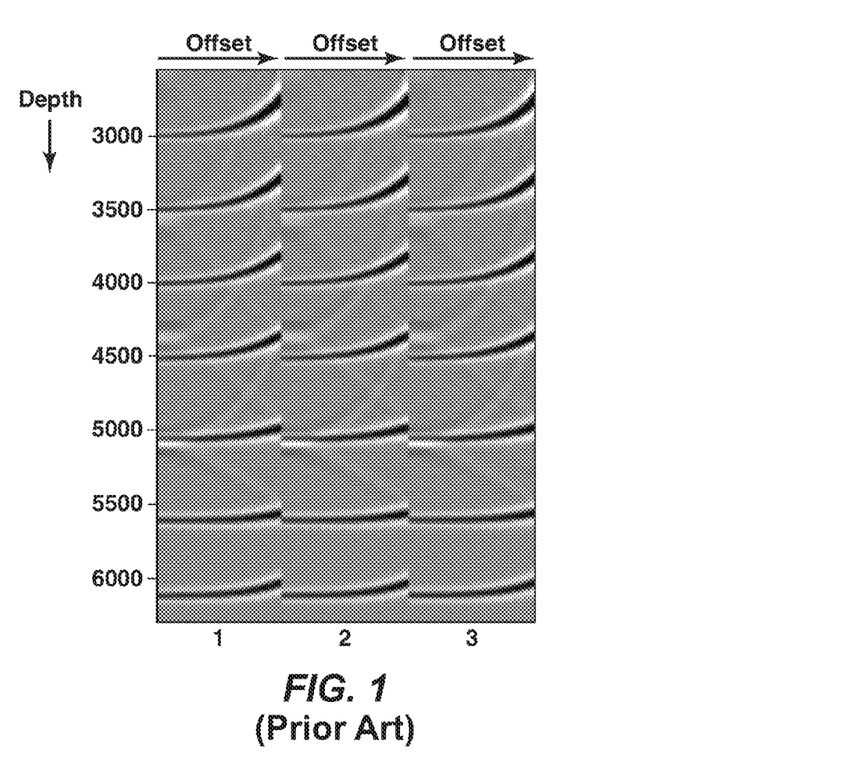
FIG. 1 illustrates three image gathers used as data input to a tomographic calculation of subsurface velocity when velocity is incorrect.

As noted above, the reflection tomography approach to velocity analysis uses gathers which may be offset gathers, angle gathers, shot gathers or receiver gathers. This disclosure will use angle gathers to describe the invention. However it should be understood that this is just an example and that offset gathers, shot gathers or receiver gathers could also be used. If the gathers are "flat" one would conclude that the images of the subsurface are consistent at each reflection angle. In this case the velocity is a candidate to be considered correct in the sense that it is consistent with available seismic data. It may happen that the computed velocity is not consistent with other data such as well data, in which case one would conclude that further analysis is needed to obtain a better velocity consistent with all available data. On the other hand if the gathers are not flat one would conclude that the velocity is incorrect in the region above the image points. An example illustrating this possibility is shown in FIG. 1, which shows synthetic data from image gathers at varying depths for three fixed (x, y) values when velocity is incorrect.

Figure 2:
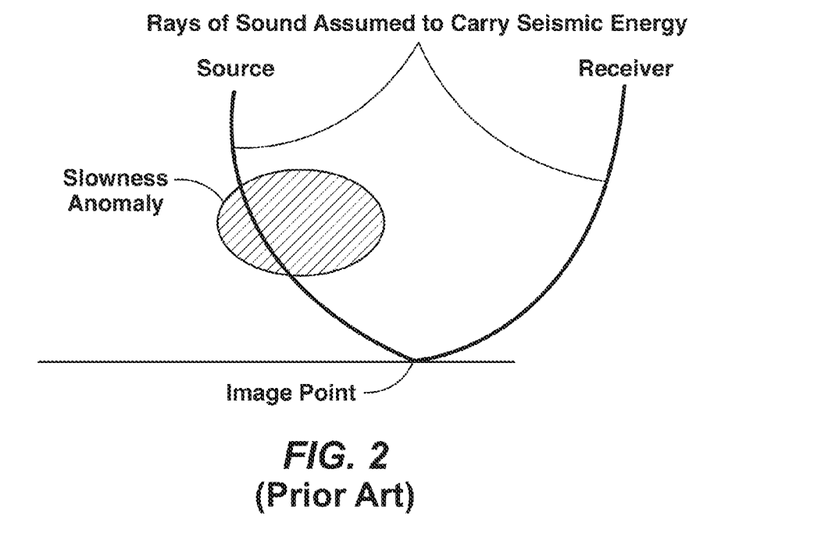
FIG. 2 illustrates reflection tomography modeling seismic energy propagation with rays.

Reflection tomography uses an iterative perturbation approach to modify an assumed input velocity with the object of converging on a velocity that is a best fit to all of the available data. FIG. 2 illustrates schematically the relationship between seismic data and a local velocity anomaly. Thin ray reflection tomography typically operates in the following way.

The object of the calculation is to set up a tomography matrix M, such that $$M \cdot \delta\sigma = \delta z \quad (1)$$

where M is the tomography matrix, δσ is the slowness (reciprocal of the velocity), and δz is the depth anomaly observed in the gathers. Typically, for thin ray tomography δz measures the difference between the imaged depth at a given offset and the imaged depth at the least offset.

Equation (1) can be written more explicitly, in terms of the matrix and vector elements, as:

$$\sum_{i2} M(i1, i2)\delta\sigma(i2) = \delta z(i1) \quad (2)$$

In a 2D case the columns of the tomography matrix M are labeled by the locations of subsurface points through which rays pass in imaging the reflector. For example the rasterized $$i2 = ix + nx^*(iz-1) \quad (3)$$

can be used. For 3D data this equation becomes:

$$i2 = ix + nx^*(iy-1) + nx^*ny^*(iz-1) \quad (4)$$

The rows of the matrix can be labeled by image points and offsets. For example in 2D this might be, for image points at a fixed depth:

$$i1 = ih + nh^*(ixp-1) \quad (5)$$

where ih labels the offsets and ixp labels the image points.

Figure 3:
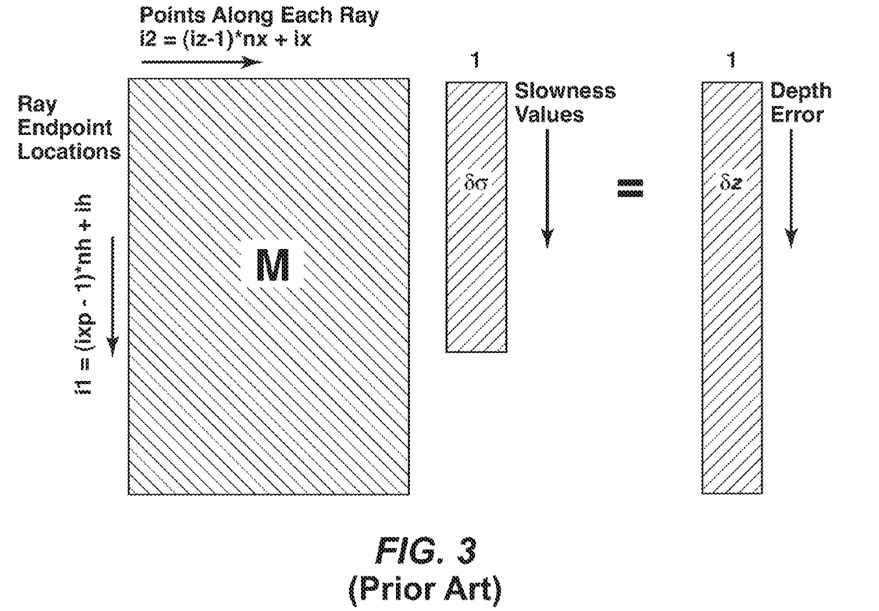
FIG. 3 illustrates the linear system used in 2D tomography.

This linear system is illustrated schematically in FIG. 3. It is typically solved for the unknown slowness error using a least squares method. For example the LSQR method of Paige and Saunders (1982) may be used.

In conventional thin ray tomography the tomography matrix starts from discretizing for reflected rays the two-way ray equation:

$$\int \delta\sigma ds = \delta\tau \quad (6)$$

where the integral covers the whole ray path from source to receiver. δτ is the total travel time error due to the slowness error δσ. The total travel time is measured from the source to the image point and back to the receiver. The travel time error can be used to compute the error in the depth image using the equations:

$$\frac{\partial z}{\partial \sigma} = -\frac{\partial \tau}{\partial \sigma}\left(\frac{\partial \tau}{\partial z}\right)^{-1} \quad (7)$$

and $$\frac{\partial \tau}{\partial z} = 2\sigma \cos\theta \cos\alpha \quad (8)$$

where θ is the reflector dip angle and α is the reflection angle. In the above equations $$\frac{\partial \tau}{\partial \sigma}$$

is the tomography matrix where the anomaly is measured in time.

Figure 4:
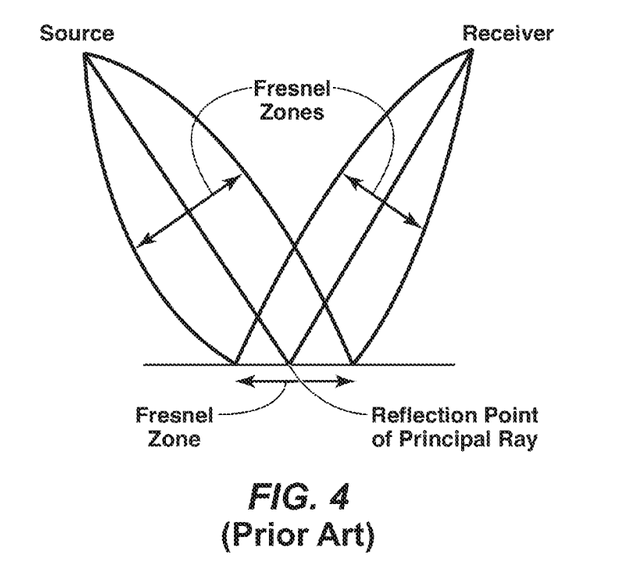
FIG. 4 illustrates the region of x-z space in which energy flows when seismic energy is reflected from a subsurface reflector in a model in which velocity is constant in the earth.

The basic idea of fat ray tomography is to replace the thin rays used in conventional tomography with fat rays, which should be designed to account for the fact that at finite frequency the region influenced by velocity changes around a ray path includes all points illustrated in FIG. 4. That is, any velocity change within the zone covered by the fat rays will cause a change in the travel time that is coherent with the principal arrival along the central ray. In FIG. 4, the central rays are straight because the velocity is assumed constant for simplicity of illustration. In a general medium of practical interest the rays are curved in a manner which depends on the velocity model.

Figure 5:
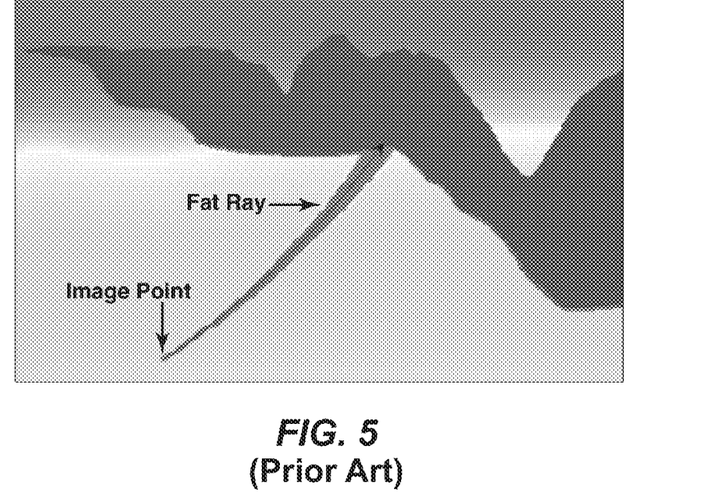
FIG. 5 illustrates an approach to fat ray tomography proposed by Xu et al.
Figure 6:
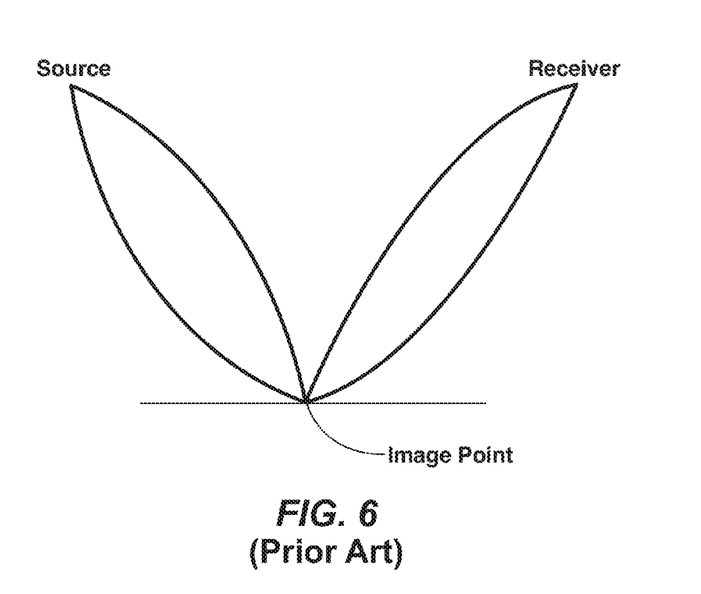
FIG. 6 illustrates an approach to wave equation fat ray tomography proposed by Bevc et al.

As noted above, the idea of using fat rays is not new, and was already extensively used in whole earth tomography. However it has not up to the present time been properly exploited in reflection tomography. FIG. 4 illustrates the general principle that for any velocity model the fat rays have negligible radius at the source and receiver but do not have zero radius at the reflection point, except in the rare situation where there is a caustic at the reflection point. The key issue is that the radius of each fat ray is required by the physics of wave propagation to depend on the velocity model and is therefore not an arbitrary parameter. FIGS. 5 and 6 illustrate published attempts to accomplish this, but as noted above they do not cover the region truly traversed by seismic energy traveling between source and receiver, and therefore cannot be considered satisfactory.

Since reflection tomography is a computationally intensive process, it is advantageous to construct code that efficiently computes the tomography matrix. FIG. 7 shows basic steps in the present inventive method, and also indicates computational efficiency steps that may be taken.

As indicated in FIG. 1, gather flatness is typically measured at selected depths at various image points in (x, y) space. This means that it is computationally efficient to construct fat rays at each of selected image points xp. An efficient way to accomplish this is to shoot rays from each selected image point to the surface tabulating the ray dip angles and Fresnel Zone parameters (i.e. the Fresnel matrix) at selected points along each ray. For example the selected points may be selected depth locations along the ray. The dip angles at each grid point can be, for example, the components of a unit vector pointing along a central ray connecting the grid point to the image point. In 2D the Fresnel matrix is a scalar; in 3D it is a 2×2 matrix.

If the reflectors of interest in the subsurface have negligible dip, the above calculation will be adequate. However, if the reflectors at some of the image points have non-negligible dip, a preferred method is as follows. Firstly the dip is estimated at each image point of interest in the stacked seismic section. This can be done by several methods of which the simplest is to smooth the data, calculate the amplitude gradient at each image point and tabulate the results. Rays are then shot from each image point to the surface, using a wide range of takeoff angles centered on the reflector normal. At each point along each ray, the ray dip angle and the P and Q matrices are calculated and stored. Subsequently fat rays can be constructed for as many reflection angles and azimuths as are required at each image point. In this way the tomography matrix can be constructed working in reflection angle space. In the case of narrow azimuth data gathers from conventional marine streamer acquisition using a single boat, the additional step of including variable azimuths may be deemed unnecessary.

Construction of the Fresnel zone proceeds as follows, and is explained first in 2D. At each grid point the Fresnel radius is required. This varies with frequency and is computed from the equation:

$$R_F = \left(\frac{1}{mf}\right)^{1/2} \qquad (9)$$

where f is the frequency, $m=m_1+m_2$, and the indices 1 and 2 refer to fat rays connected to the source and receiver respectively. Each of these quantities is computed for i=1, 2 from:

$$m_i = p_i / q_i \qquad (10)$$

$$\frac{dq_i}{ds} = p_i v \qquad (11)$$

$$\frac{dp_i}{ds} = -\left(\frac{v_{nn}}{v^2}\right) q_i \qquad (12)$$

where p, q, m are standard parameters for dynamic ray tracing as explained, for example by Cerveny (1985). The local velocity is v and the symbol $v_{nn}$ means the second space derivative of the velocity normal to the central ray. Equations (10-12), appropriate for 2D imaging, generalize in a straightforward way to 3D, as described by Cerveny at pages 41-43 which pages are incorporated herein by reference in all jurisdictions that allow it.

Thus, to generalize equations (9) through (12) to three dimensions, at each grid point the Fresnel matrix is given by an equation that can be expressed as $$\hat{m} = \hat{m}_1 + \hat{m}_2$$

where indices 1 and 2 refer to fat rays connected to the source and receiver respectively, and $\hat{m}_1$ and $\hat{m}_2$ are:

$$\hat{m}_i = \hat{P}_i / \hat{Q}_i,$$

$$\frac{d\hat{Q}_i}{ds} = v\hat{P}_i, \text{ and}$$

$$\frac{d\hat{P}_i}{ds} = -\left(\frac{\hat{V}}{v^2}\right)\hat{Q}_i$$

where $\hat{P}_i$, $\hat{Q}_i$, $\hat{m}_i$ are standard parameters for dynamic ray tracing, v is local seismic wave velocity and $\hat{V}$ is the Hessian matrix of second space derivatives of v normal to the fat ray's central ray.

Figure 8:
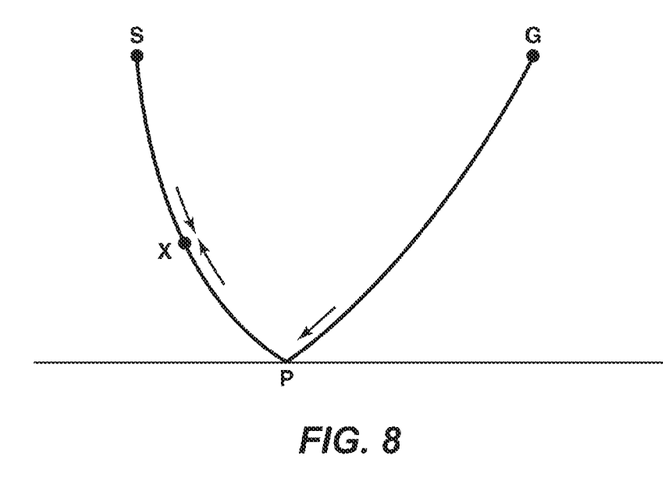
FIG. 8 illustrates the central rays required for fat ray imaging when calculating the Fresnel zone size.
Figure 9:
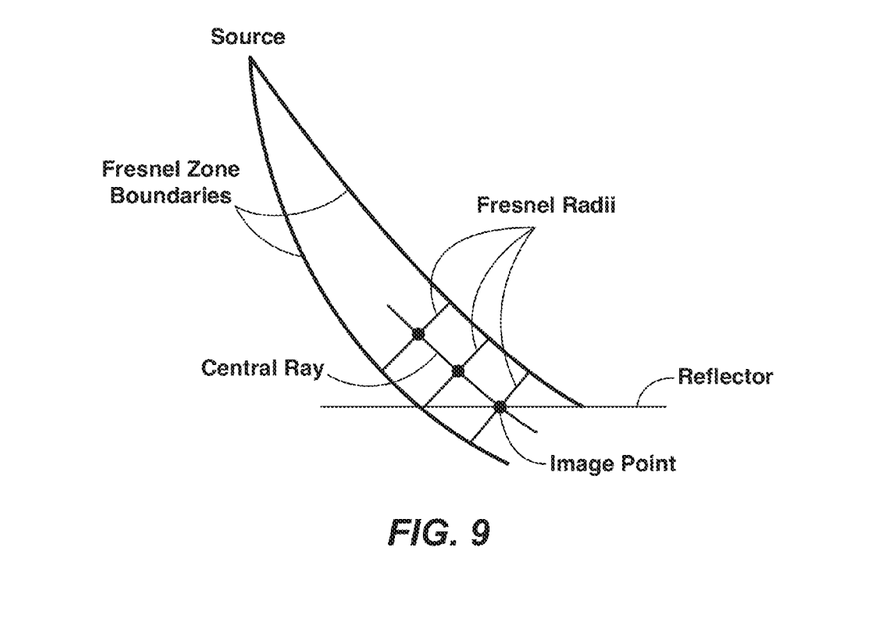
FIG. 9 illustrates the construction of a fat ray needed for the tomography matrix.

Because the ray tracing originates from subsurface image points as explained above, while at the same time the above quantities have to originate from the source and receiver points on the surface, special care is needed to ensure that the quantities $m_i$ are properly calculated. This is accomplished as schematically illustrated in FIGS. 8 and 9. In principle the method is related to that of Cerveny and Soares (1992). These authors however describe the situation for transmission imaging by tracing rays from the source all the way to the receiver. This is an inefficient method for reflection imaging.

A key step is to compute, using the ordinary differential equations above, the propagator matrix $\pi(\Sigma, P)$ from each image point P to each required surface point $\Sigma$, and $\pi(X, P)$ from each image point P to each required subsurface point X. A convenient reference on the general subject of seismic propagators is Gilbert and Backus (1966). In 2D the propagator matrix is 2×2, and $$\pi(S, P) = \begin{pmatrix} Q_1 & Q_2 \\ P_1 & P_2 \end{pmatrix}$$

is the propagator from each image point P to the source S, while $$\pi(G, P) = \begin{pmatrix} R_1 & R_2 \\ S_1 & S_2 \end{pmatrix}$$

is the propagator from each image point P to the receiver G, and $$\pi(X, P) = \begin{pmatrix} q_1 & q_2 \\ p_1 & p_2 \end{pmatrix}$$

is the propagator from each image point P to a general point X, where $Q_1$, $P_1$, $R_1$, $S_1$, $q_1$, and $p_1$ are computed from the initial conditions p=0, q=1 (a plane wave initial condition); and $Q_2$, $P_2$, $R_2$, $S_2$, $q_2$, and $p_2$ are computed from the initial conditions q=0, p=1 (a point source initial condition). When a ray is reflected from a locally flat interface, the off-diagonal elements of the propagator change sign to reflect the change from downward to upward propagation.

With these methods in mind, the equations to generate the surface originating quantities from the image point originating quantities are:

$$m_1 = \frac{p_2 Q_1 - p_1 Q_2}{q_2 Q_1 - q_1 Q_2} \tag{13}$$

and $$m_2 = \frac{p_2 R_1 + p_1 R_2}{q_2 R_1 + q_1 R_2} \tag{14}$$

In 3D the gathers can be chosen to depend on azimuthal angle as well as reflection angle and can be flattened over azimuthal angle as well as reflection angle. This naturally improves the spatial resolution of velocity in 3D space. The azimuthal angle used may be surface azimuth, or preferably the azimuthal angle at the reflector. For 3D propagation, the rays are preferably shot from each image point to the surface using a range of reflection angles and azimuths taking account of the dip of the reflector previously estimated as described above.

The generalization of equations (13) and (14) is:

$$\hat{m}_1 = (\hat{p}_2 \hat{Q}_1^T - \hat{p}_1 \hat{Q}_2^T)(\hat{q}_2 \hat{Q}_1^T - \hat{q}_1 \hat{Q}_2^T)^{-1} \tag{15}$$

and $$\hat{m}_2 = (\hat{p}_2 \hat{R}_1^T + \hat{p}_1 \hat{R}_2^T)(\hat{q}_2 \hat{R}_1^T + \hat{q}_1 \hat{R}_2^T)^{-1} \tag{16}$$

where the caret symbol (^) denotes that the m, p, q, Q, R symbols are now 2×2 matrices.

In this case the Fresnel Zone is an ellipse oriented perpendicular to the central ray and whose azimuthal orientation around the central ray and major and minor axes are controlled by the 2×2 symmetric matrix $\hat{m} = \hat{m}^1 + \hat{m}_2$. Explicitly, if $$\hat{m} \equiv \begin{pmatrix} a & b \\ b & c \end{pmatrix}$$

the azimuthal orientation of the ellipse is given by $$\theta = \frac{1}{2}\arctan(2b/(a-c)) \tag{17}$$

and the major and minor axes are given by:

$$\frac{2}{r^2} = a + c \mp (4b^2 + (a-c)^2)^{1/2} \tag{18}$$

In some cases the eccentricity of the ellipse is sufficiently small that it can be approximated by a circle. Equations (17) and (18) are the three dimensional equivalent of equation (9).

The simplest way to construct Fresnel Zones is to estimate their radius substituting the central frequency of the pulse into equation (9). However a preferred method is to optimize the fat rays over a range of frequencies. This is achieved by integrating the beam shape over the frequency range of the data as discussed for whole earth studies by Dahlen et al. (2000a), and by Xie and Yang (2008) in a wave equation based context.

$$\delta t = \int d\omega \omega^2 \delta t(\omega) |g(\omega)|^2 / \int d\omega \omega^2 |(\omega)|^2 \tag{19}$$

where $g(\omega)$ is the pulse shape which should be estimated from the seismic data, and $\delta t$ is the total travel time error due to the velocity error while $\delta t(\omega)$ is the total travel time error at circular frequency $\omega$.

The appropriate equations at each frequency are, respectively in 2D and 3D:

$$\delta t(\omega) = \left\{\frac{\omega}{2\pi}\right\}^{1/2} \int ds \int dx \delta\sigma(s, x) m^{1/2} \cos(\omega m x^2/2 - \pi/4) \tag{20}$$

$$\delta t(\omega) = \frac{\omega}{2\pi} \int ds \int d^2 x \delta\sigma(s, \vec{x})(\det(\hat{m}))^{1/2} \sin\left(\frac{\omega}{2}\vec{x}^T \hat{m}\vec{x}\right) \tag{21}$$

Figure 10:
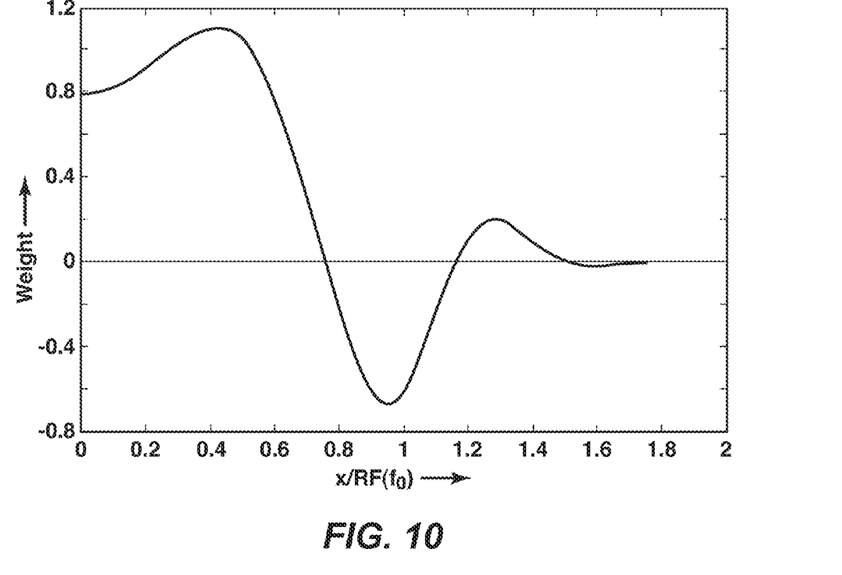
FIG. 10 illustrates the fat ray profile in 2D.
Figure 11:
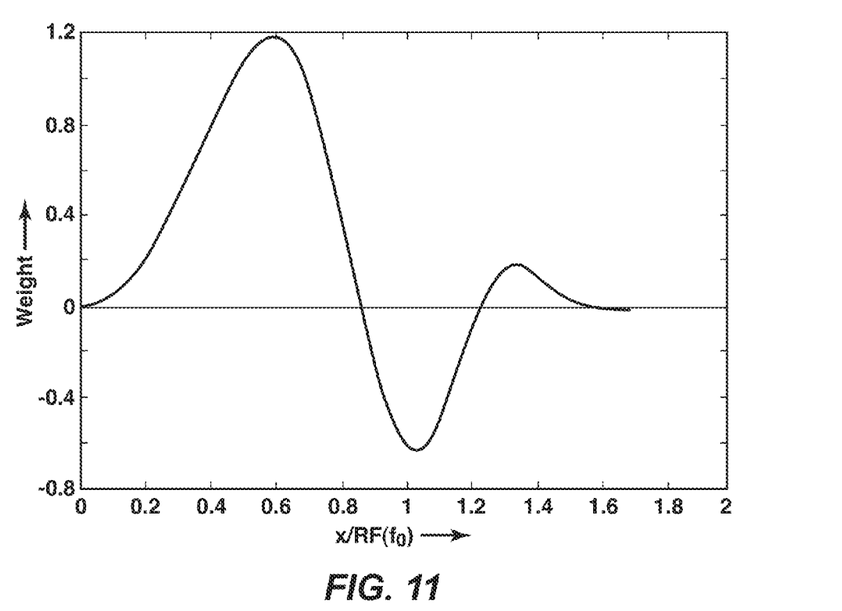
FIG. 11 illustrates the fat ray profile in 3D.

Examples of the beam shape for 2D and 3D data using a Ricker pulse peaked at $f_o$=30 Hz are shown in FIGS. 10 and 11. In these plots, x is the distance from the central ray of the beam in a direction normal to the central ray, and $RF(f_0)$ is the Fresnel radius at the central frequency, so that the plots are made versus the dimensionless quantity $x/RF(f_0)$. The quantity plotted on the vertical axes and FIGS. 10 and 11 is referred to as "weight," because this is used to normalize the fat ray entries in the tomography matrix. This shape is interpolated and normalized onto the (x, y, z) grid while propagating the fat rays upwards as shown in FIGS. 8 and 9.

Example

Figure 12A:
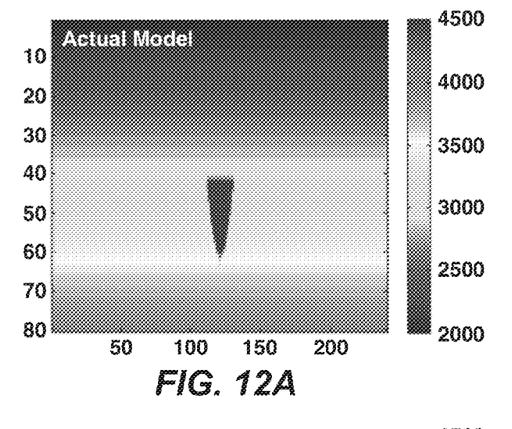
FIG. 12 illustrates tomographic output for test data with input and model velocity.
Figure 12B:
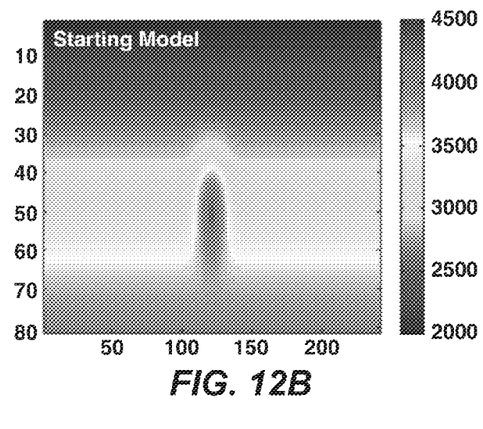

FIGS. 12A-D show a comparison of the performance of the present method on a test model, with the axes representing depth and lateral distance. FIG. 12A shows the actual velocity test model; FIG. 12B shows the starting velocity model; FIG.

Figure 12C:
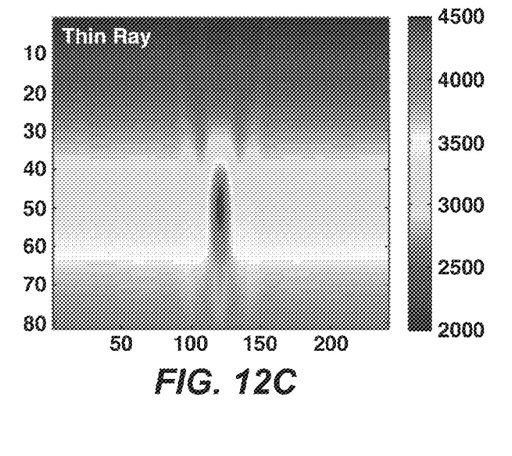
Figure 12D:
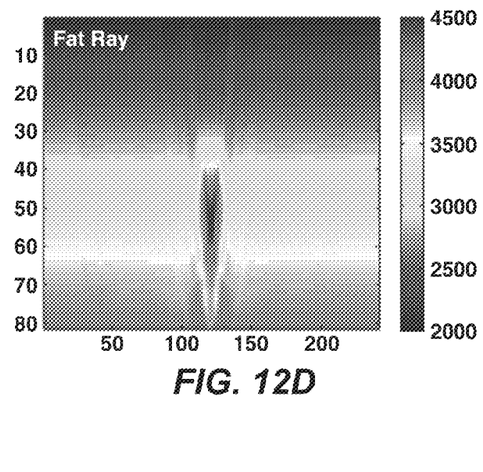

12C shows the result of using conventional thin ray tomography which is approximately the same as using a narrow band version of the present method, not summing over frequencies. FIG. 12D shows the result with the present method. There is clear improvement in resolution of the target.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in practical applications of the invention, at least some of the steps in the present inventive method are performed on or with the aid of a computer, i.e. the invention is computer implemented.

References

Bevc et al (2008): SEG expanded abstracts 27, 3098-3102
Cerveny (1985): in Seismic Shear Waves Part A: Theory, ed. G. P. Dohr Publ. Geophysical Press, London.
Cerveny and Soares (1992): *Geophysics* 57, 902-915.
Dahlen et al (2000a): *Geoph. J. Int.* 141, 157-174
Dahlen et al (2000b): *Geoph. J. Int.* 141, 175-203
De Hoop et al (2006): *Geophys. J. Int.* 167, 1332-1352.
Gilbert and Backus (1966): *Geophysics* 31, 326-332
Paige and Saunders (1982): ACM Transactions on Mathematical Software (TOMS) 8, 43-71.
Xie and Yang (2008): *Geophysics* 73, S241-S249
Xu et al (2006): SEG expanded abstracts 25, 3354-3358

The invention claimed is:

1. A hydrocarbon exploration method for imaging subsurface structure from seismic data, comprising:
    generating a velocity model by fat-ray tomography, performed using a computer, wherein each fat ray is shot from a reflection point to a surface source or receiver location and is defined by a Fresnel matrix and dip at each ray-tracing grid point, said Fresnel matrix depending upon the velocity model at each grid point, including at the reflection point; and
    using the velocity model to migrate the seismic data, thereby forming a subsurface image.

2. The method of claim 1, wherein at each grid point the Fresnel matrix is given by an equation that can be expressed as $$\hat{m} = \hat{m}_1 + \hat{m} m_2$$

where indices 1 and 2 refer to fat rays connected to the source and receiver respectively, and $\hat{m}_1$ and $\hat{m}_2$ are:

$$\hat{m}_i + \hat{P}_i / \hat{Q}_i,$$

$$d\hat{Q}_i / ds + v\hat{P}_i, \text{ and}$$

$$d\hat{P}_i / ds = -\left(\frac{\hat{V}}{v^2}\right)\hat{Q}_i$$

where $\hat{P}_i$, $\hat{Q}_i$, $\hat{m}_i$ are standard parameters for dynamic ray tracing, v is local seismic wave velocity and $\hat{V}$ is the Hessian matrix of second space derivatives of v normal to the fat ray's central ray.

3. The method of claim 2, wherein $\hat{m}_1$ and $\hat{m}_2$ are given by expressions $$\hat{m}_1 = (\hat{p}_2 \hat{Q}_1^T - \hat{p}_1 \hat{Q}_2^T)(\hat{q}_2 \hat{Q}_1^T - \hat{q}_1 \hat{Q}_2^T)^{-1}$$

and $$\hat{m}_2 = (\hat{p}_2 \hat{R}_1^T + \hat{p}_1 \hat{R}_2^T)(\hat{q}^2 \hat{R}_1^T + \hat{q}_1 \hat{R}_2^T)^{-1}$$

where $\hat{Q}_1, \hat{P}_1, \hat{R}_1, \hat{S}_1, \hat{q}_1$, and $\hat{q}_2$ are computed from plane wave initial conditions P=0, Q=1 and $\hat{Q}_2, \hat{P}_2, \hat{R}_2, \hat{S}_2, \hat{q}_2$, and $\hat{p}_2$ are computed from point source initial conditions Q=0, P=1.

4. The method of claim 1, wherein Fresnel zones giving the fat ray's beam shape are constructed by optimizing each fat ray over a range of frequencies by integrating the fat ray's beam shape over the seismic data's frequency range.

5. The method of claim 1, wherein the migrating the seismic data further comprises:
    (a) picking depth errors from image data gathers of different source-receiver offsets, and computing ray dip values at each pick location on stacked seismic data, and storing depth errors and dip values in computer memory or data storage;
    (b) determining a fat ray beam shape for a central frequency using an initial velocity model, said central frequency being determined from an assumed seismic wave pulse shape;
    (c) dynamically tracing rays from selected reflection points to the surface source and receiver locations, and storing Fresnel zone parameters, ray dip angles and surface locations in computer memory or data storage;
    (d) using the fat ray beam shape and the stored Fresnel zone parameters to write elements of a tomography matrix M taking into account the stored dip values at the pick locations;
    (e) solving the tomography linear system $$M \cdot \delta\sigma = \delta z$$

using a least squares method, where $\delta\sigma$ is the slowness, i.e. reciprocal of the velocity, and $\delta z$ represents the depth errors observed in the image data gathers, and making a new velocity model from the solutions for $\delta\sigma$, and
    (f) migrating the seismic data with the new velocity model.

6. The method of claim 5, further comprising:
    (g) checking gathers of data migrated by the new velocity model for flatness according to a selected criterion for flatness; and
    (h) stopping if the criterion is met, but if the criterion is not met, repeating (a)-(h) using the new velocity model as the initial velocity model in (b) until the criterion is met or another stopping condition occurs.

7. The method of claim 1, wherein the Fresnel matrix for each fat ray defines an ellipse in a plane oriented perpendicular to the fat ray's central ray.

8. The method of claim 7, wherein the ellipse has semi-major and semi-minor axes given by:

$$\frac{2}{r^2} = a + c \mp (4b^2 + (c-a)^2)^{1/2}$$

where the Fresnel matrix is:

$$\hat{m} \equiv \begin{pmatrix} a & b \\ b & c \end{pmatrix}.$$

9. The method of claim 8, wherein the ellipse has an azimuthal orientation θ given by $$\theta = \frac{1}{2}\arctan(2b/(c-a)).$$

10. The method of claim 1, wherein the fat ray's beam shape is determined based on an assumed seismic wavelet pulse shape as a function of frequency, and a central frequency determined from the assumed pulse shape.

11. The method of claim 1, wherein generating the velocity model comprises performing the following steps on a computer:
  processing the seismic data through migration to produce offset, angle, source, or receiver gathers of images;
  estimating a measure of non-flatness of said gathers;
  estimating the seismic data's pulse shape at one or more selected image points of interest;
  estimating an initial velocity model;
  dynamically tracing rays from each selected image point to the surface;
  computing a Fresnel zone size, shape and orientation at points along each ray from each selected image point, and using this to construct fat rays;
  computing an associated tomography matrix using the fat rays;
  estimating an updated velocity model using the tomography matrix and the estimated non-flatness of the gathers of data.

12. The method of claim 11, wherein computing the Fresnel zone size, shape and orientation includes estimating a pulse shape for the seismic data and determining its central frequency.

13. The method of claim 11, wherein the tomography matrix is determined from the fat ray's beam shape and parameters that determine the Fresnel zone.

14. The method of claim 11, wherein the velocities in the updated velocity model are computed from the tomography matrix and the estimated non-flatness of the gathers by LSQR or another least squares method.

15. A non-transitory computer readible medium containing computer instructions stored therein for causing a computer processor to perform a hydrocarbon exploration method for imaging subsurface structure from seismic data, said method comprising:
  (a) picking depth errors from image data gathers of different source-receiver offsets, and computing ray dip values at each pick location on stacked seismic data, and storing depth errors and dip values in computer memory or data storage;
  (b) determining a fat ray beam shape for a central frequency using an initial velocity model, said central frequency being determined from an assumed seismic wave pulse shape;
  (c) dynamically tracing rays from selected reflection points to the surface source and receiver locations, and storing Fresnel zone parameters, ray dip angles and surface locations in computer memory or data storage;
  (d) using the fat ray beam shape and the stored Fresnel zone parameters to write elements of a tomography matrix M taking into account the stored dip values at the pick locations;
  (e) solving the tomography linear system $$M \cdot \delta\sigma = \delta z$$

using a least squares method, where δσ is the slowness, i.e. reciprocal of the velocity, and δz represents the depth errors observed in the image data gathers, and making a new velocity model from the solutions for δσ, and
  (f) migrating the seismic data with the new velocity model.

* * * * *